United States Patent
Jia (10) Patent No.: US 11,929,558 B2
(45) Date of Patent: Mar. 12, 2024

(54) MILLIMETER WAVE ANTENNA APPARATUS AND ELECTRONIC DEVICE

(71) Applicant: GUANGDONG OPPO MOBILE TELECOMMUNICATIONS CORP., LTD., Guangdong (CN)

(72) Inventor: Yuhu Jia, Guangdong (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 310 days.

(21) Appl. No.: 17/473,737

(22) Filed: Sep. 13, 2021

(65) Prior Publication Data

US 2021/0408683 A1 Dec. 30, 2021

Related U.S. Application Data

(63) Continuation of application No. PCT/CN2020/079168, filed on Mar. 13, 2020.

(30) Foreign Application Priority Data

Mar. 20, 2019 (CN) .......................... 201910211070.4

(51) Int. Cl.
*H01Q 3/46* (2006.01)
*H01Q 9/04* (2006.01)
*H04M 1/02* (2006.01)

(52) U.S. Cl.
CPC ............. *H01Q 3/46* (2013.01); *H01Q 9/0407* (2013.01); *H04M 1/026* (2013.01)

(58) Field of Classification Search
CPC ........ H01Q 3/46; H01Q 9/0407; H01Q 1/422; H01Q 15/08; H01Q 1/243; H01Q 1/36; H01Q 1/22; H01Q 1/38; H04M 1/026
See application file for complete search history.

(56) References Cited

U.S. PATENT DOCUMENTS 6,674,392 B1   1/2004  Schmidt et al.
6,822,612 B2 * 11/2004  Takimoto ............... H01Q 3/14
                                                   343/754

(Continued)

FOREIGN PATENT DOCUMENTS

CN    102290638 A    12/2011
CN    102437424 A     5/2012

(Continued)

OTHER PUBLICATIONS

Extended European Search Report for EP Application 20773872.5 dated Mar. 15, 2022. (11 pages).

(Continued)

*Primary Examiner* — Seung H Lee
(74) *Attorney, Agent, or Firm* — Young Basile Hanlon & MacFarlane, P.C.

(57) ABSTRACT

A millimeter wave antenna apparatus for an electronic device includes a rear housing and at least one antenna assembly, the at least one antenna assembly includes a millimeter wave module spaced apart from the rear housing, and being configured to transceive millimeter wave signal; a beam of the millimeter wave signal pointing towards the outside of the rear housing; a dielectric layer arranged in a target area of the rear housing, the target area at least comprising an area where the millimeter wave module is projected onto the rear housing, the dielectric layer and a part of the rear housing in the target area together forming a radiation layer with gradient distribution of dielectric constant, and the radiation layer being configured to change a beam radiation direction of the millimeter wave signal.

20 Claims, 5 Drawing Sheets

(56) References Cited

U.S. PATENT DOCUMENTS

2017/0201014 A1  7/2017 Lee et al.
2018/0191081 A1  7/2018 Lukyanov et al.

FOREIGN PATENT DOCUMENTS

| CN | 106159421 A | 11/2016 |
|----|-------------|---------|
| CN | 107946738 A | 4/2018 |
| CN | 108432041 A | 8/2018 |
| CN | 109103604 A | 12/2018 |
| CN | 109390667 A | 2/2019 |
| EP | 1193795 A2 | 4/2002 |
| JP | 2000295029 A | 10/2000 |
| JP | 2005217864 A | 8/2005 |

OTHER PUBLICATIONS

International Search Report with English Translation for International Application PCT/CN2020/079168 dated Jun. 12, 2020. (12 pages).
Chinese First Office Action with English Translation for CN Application 201910211070.4 dated Jan. 5, 2021. (12 pages).
Chinese Second Office Action with English Translation for CN Application 201910211070.4 dated May 20, 2021. (123 pages).

\* cited by examiner

MILLIMETER WAVE ANTENNA APPARATUS AND ELECTRONIC DEVICE

CROSS-REFERENCE TO RELATED APPLICATION(S)

The present disclosure is a continuation-application of International (PCT) Patent Application No. PCT/CN2020/079168 filed on Mar. 13, 2020, which claims priority of Chinese Patent Application No. 201910211070.4, filed on Mar. 20, 2019, the entire contents of both of which are hereby incorporated by reference.

TECHNICAL FIELD

This application relates to the field of communication technology, and in particular to a millimeter wave antenna apparatus and an electronic device.

BACKGROUND

The statements herein provide only background information relevant to the present disclosure and do not necessarily constitute prior art.

Millimeter wave (Mm-wave) is an electromagnetic wave between microwave and light wave, usually the millimeter wave band refers to 30~300 GHz, the corresponding wavelength is 1~10 mm, millimeter wave may provide a wider frequency band. With the high growth of information volume, the transmission circulation will also be increasing, and the transmission technology of millimeter wave band has been regarded as one of the key communication technologies with high quality transmission capability.

In general, the millimeter wave antenna apparatus may only radiate the beam of millimeter wave signal in a fixed direction when transceiving millimeter wave signals, which leads to a low gain of the millimeter wave antenna apparatus.

SUMMARY

The present disclosure provides a millimeter wave antenna apparatus and an electronic device according to various embodiments of the present disclosure.

A millimeter wave antenna apparatus for an electronic device, comprising a rear housing, and at least one antenna assembly, the at least one antenna assembly comprises: a millimeter wave module, spaced apart from the rear housing, being configured to transceive millimeter wave signal; a beam of the millimeter wave signal pointing towards the outside of the rear housing; a dielectric layer, arranged in a target area of the rear housing, the target area at least comprising an area where the millimeter wave module is projected onto the rear housing, the dielectric layer and a part of the rear housing in the target area together forming a radiation layer with gradient distribution of dielectric constant, and the radiation layer being configured to change a beam radiation direction of the millimeter wave signal.

An electronic device comprising a rear housing and the above millimeter wave antenna apparatus.

A rear housing assembly for an electronic device, comprising: a rear housing, and a dielectric layer, arranged on an area of the rear housing, wherein the area of the rear housing is configured to be an area where an orthographic projection of a millimeter wave module of the electronic device on the rear housing is located in; wherein the dielectric layer and a part of the rear housing in the area together form a radiation layer with gradient distribution of dielectric constant; a dielectric constant of the dielectric layer is different from that of the rear housing; the radiation layer is configured to change a beam radiation direction of millimeter wave signal transceived by the millimeter wave module.

Details of one or more embodiments of the present disclosure are presented in the accompanying drawings and description below. Other features, purposes and advantages of the present disclosure will become apparent from the specification, the accompanying drawings, and the claims.

BRIEF DESCRIPTION OF DRAWINGS

In order to illustrate technical solutions of the embodiments of the present disclosure clearly, accompanying drawings for describing the embodiments will be introduced in brief. Obviously, the drawings in the following description are only some embodiments of the present disclosure. For the person of ordinary skill in the art, other drawings may be obtained based on the provided drawings without any creative work.

DETAILED DESCRIPTION

In order to make the purpose, technical solutions and advantages of the present disclosure clearer and more understandable, the following is a further detailed description of the present application in conjunction with the accompanying drawings and embodiments. It should be understood that the specific embodiments described herein are intended to explain the present disclosure only and are not intended to limit the present disclosure.

It will be understood that the terms "first", "second", etc. as used in this application may be used herein to describe various components, but these components are not limited by these terms. These terms are used only to distinguish a first element from another element. For example, without going beyond the scope of this disclosure, the first area may be referred to as the second area, and similarly, the second area may be referred to as the first area. Both the first area and the second area are areas, but they are not the same area.

It should be noted that when a component is "arranged on" another element, it may be directly arranged on another element or indirectly arranged on another element via intervening structures. When a component is "connected" to another component, it may be directly connected to another component or indirectly connected to another element via intervening structures.

The millimeter wave antenna apparatus of an embodiment of the present disclosure is for an electronic device, the electronic device includes a rear housing. In one embodiment, the electronic device may be a communication module including a cell phone, a tablet, a laptop, a handheld computer, a Mobile Internet Device (MID), a wearable device (e.g., a smart watch, a smart bracelet, a pedometer, etc.), or other communication module that may be provided with a millimeter wave antenna module.

A millimeter wave antenna apparatus for an electronic device, comprises a rear housing, and at least one antenna assembly. The at least one antenna assembly comprises: a millimeter wave module, spaced apart from the rear housing, and being configured to transceive millimeter wave signal; a beam of the millimeter wave signal pointing towards the outside of the rear housing; a dielectric layer, arranged in a target area of the rear housing, the target area at least comprising an area where the millimeter wave module is projected onto the rear housing, the dielectric layer and a part of the rear housing in the target area together forming a radiation layer with gradient distribution of dielectric constant, and the radiation layer being configured to change a beam radiation direction of the millimeter wave signal.

In some embodiments, a dielectric constant of the dielectric layer is greater than a dielectric constant of the rear housing.

In some embodiments, in response to the rear housing being made of non-metal materials, the target area comprises any area corresponding to the millimeter wave module, wherein the corresponding area is within a radiation range of the millimeter wave module.

In some embodiments, in response to the rear housing being made of metal or other conductive materials, a gap is arranged at the rear housing to radiated millimeter wave signal, the target area comprises the rear housing corresponding to the millimeter wave module and adjacent to the gaps.

In some embodiments, the cross-sectional shape of dielectric layer perpendicular to the rear housing is a rectangle, an ellipse, or a semi-circle.

In some embodiments, the target area comprises a first area where an orthographic projection of the millimeter wave module on the rear housing is located in; the dielectric layer is arranged in the first area, the dielectric layer and the part of the rear housing in the target area together form a first radiation layer having a phase distribution of convex lens, the first radiation layer is configured to focus a beam of the millimeter wave signal.

In some embodiments, the target area comprises a first area where an orthographic projection of the millimeter wave module on the rear housing is located in, a second area at one side of the first area and a third area at the other side of the first area; the second area is spaced apart from the first area, or partly overlapped with the first area; the third area is spaced apart from the first area, or partly overlapped with the first area; the dielectric layer comprises a first dielectric portion and a second dielectric portion, wherein the first dielectric portion is arranged in the second area, the second dielectric portion is arranged in the third area; the first dielectric portion, the second dielectric portion and the part of the rear housing in the target area together form a second radiation layer having a phase distribution of concave lens, the second radiation layer is configured to change a beam direction of the millimeter wave signal.

In some embodiments, the first dielectric portion and the second dielectric portion are arranged symmetrically at both sides of the first area.

In some embodiments, a distance between the first dielectric portion and the second dielectric portion is 0.5 to 2 times a wavelength of the millimeter wave signal.

In some embodiments, the antenna assembly further comprises a first millimeter wave module and a second millimeter wave module; the target area comprises a fourth area and a fifth area distributed spacing apart from each other; an orthographic projection of the first millimeter wave module and an orthographic projection of the second millimeter wave module are both partly within the range of between the fourth area and the fifth area; the dielectric layer comprises a third dielectric portion and a fourth dielectric portion arranged in a spaced manner, the third dielectric portion is arranged in the fourth area, the fourth dielectric portion is arranged in the fifth area; the third dielectric portion, the fourth dielectric portion and the part of the rear housing in the target area together form a third radiation layer, the third radiation layer is configured to change a beam direction of the millimeter wave signal.

In some embodiments, the rear housing comprises a first face and a second face arranged opposite to each other, the dielectric layer is arranged on the first face and/or the second face.

In some embodiments, the dielectric layer comprises a planar type film or a gradient type film.

In some embodiments, wherein the antenna array comprises a plurality of periodically arranged patch antenna units.

An electronic device comprising a rear housing and a millimeter wave antenna apparatus; the millimeter wave antenna apparatus comprises at least one antenna assembly, the at least one antenna assembly comprises: a millimeter wave module, spaced apart from the rear housing, and being configured to transceive millimeter wave signal; a beam of the millimeter wave signal pointing towards the outside of the rear housing; a dielectric layer, arranged on the rear housing and in a target area of the rear housing, the target area at least comprising an area where the millimeter wave module is projected onto the rear housing, the dielectric layer and a part of the rear housing in the target area together forming a radiation layer with gradient distribution of dielectric constant, and the radiation layer being configured to change a beam radiation direction of the millimeter wave signal.

In some embodiments, a dielectric constant of the dielectric layer is greater than the dielectric constant of the rear housing.

In some embodiments, the target area comprises a first area where an orthographic projection of the millimeter wave module on the rear housing is located in; the dielectric layer is arranged in the first area, the dielectric layer and the part of the rear housing in the target area together form a first radiation layer having a phase distribution of convex lens, the first radiation layer is configured to focus a beam of the millimeter wave signal.

In some embodiments, the target area comprises a first area where an orthographic projection of the millimeter wave module on the rear housing is located in; a second area at one side of the target area and a third area at the other side of the target area; the second area is spaced apart from the first area, or partly overlapped with the first area; the third area is spaced apart from the first area or partly overlapped with the first area; the dielectric layer comprises a first dielectric portion and a second dielectric portion, wherein the first dielectric portion is arranged in the second area, the second dielectric portion is arranged in the third area; the first dielectric portion, the second dielectric portion and the part of the rear housing in the target area together form a second radiation layer having a phase distribution of concave lens, the second radiation layer is configured to change a beam direction of the millimeter wave signal.

In some embodiments, the antenna assembly further comprises a first millimeter wave module and a second millimeter wave module; the target area comprises a fourth area and a fifth area spacing apart from each other; an orthographic projection of the first millimeter wave module and an orthographic projection of the second millimeter wave module are both partly within the range of between the fourth area and the fifth area; the dielectric layer comprises a third dielectric portion and a fourth dielectric portion arranged in a spaced manner, the third dielectric portion is arranged in the fourth area, the fourth dielectric portion is arranged in the fifth area; the third dielectric portion, the fourth dielectric portion and the part of the rear housing in the target area together form a third radiation layer, the third radiation layer is configured to change a beam direction of the millimeter wave signal.

In some embodiments, the electronic device comprises a top and a bottom, the top and the bottom are opposite to each other along the length of the electronic device, and the millimeter wave antenna apparatus is arranged closer to the top than to the bottom.

A rear housing assembly for an electronic device, comprises: a rear housing, and a dielectric layer, arranged on an area of the rear housing, wherein the area of the rear housing is configured to be an area where an orthographic projection of a millimeter wave module of the electronic device on the rear housing is located in; wherein the dielectric layer and a part of the rear housing in the area together form a radiation layer with gradient distribution of dielectric constant; a dielectric constant of the dielectric layer is different from that of the rear housing; the radiation layer is configured to change a beam radiation direction of millimeter wave signal transceived by the millimeter wave module.

Figure 1:
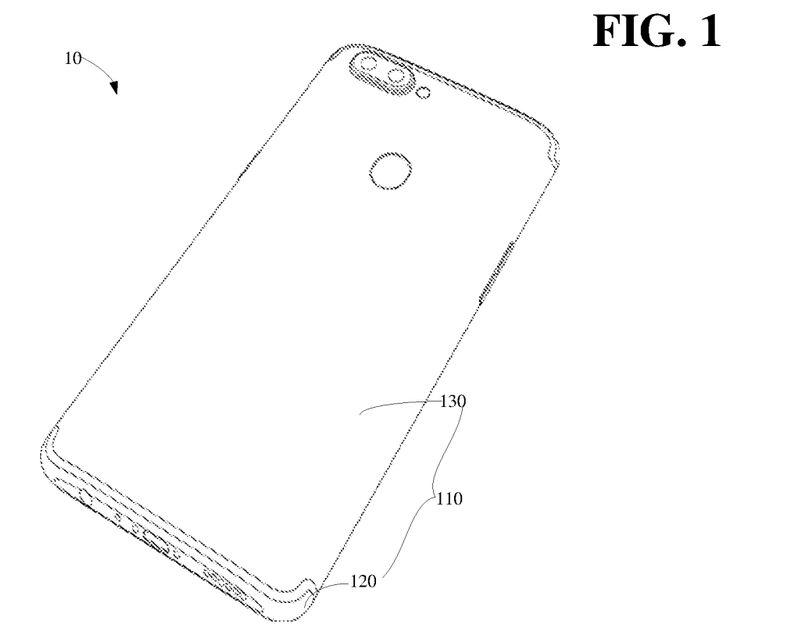
FIG. 1 is a perspective view of an electronic device according to an embodiment of the present disclosure.

As shown in FIG. 1, in the embodiments of the present disclosure, the electronic device 10 may include a display screen assembly, a housing assembly 110, and a controller. The display screen assembly is fixed to the housing assembly 110, together with the housing assembly 110 forming an external structure of the electronic device. The housing assembly 110 may include a middle frame 160 and a rear housing 130. The middle frame 160 may be a frame structure with a hole. The middle frame 160 may be received in an accommodation space defined by the display screen assembly and the rear housing 130. The rear housing 130 is configured to form the exterior contour of electronic device 10. The rear housing 130 may be formed of a single piece. During the forming process of the rear housing 130, structures such as a rear camera hole, a fingerprint recognition module, mounting hole for an antenna device, and the like may be formed on the rear housing 130. The rear housing 130 may be a non-metal rear housing, for example, the rear housing may be a plastic rear housing, a ceramic rear housing, a 3D glass rear housing, or the like. The controller may control the operation of the electronic device. The display screen assembly may be configured to display pictures or font and may provide an operating interface for a user.

Figure 2:
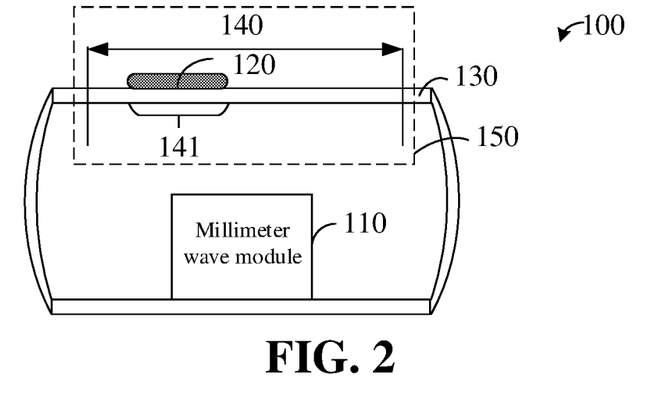
FIG. 2 is a schematic view of a millimeter wave antenna apparatus according to an embodiment of the present disclosure.

As shown in FIG. 2, in one of the embodiments, a millimeter wave antenna apparatus 100 includes at least one antenna assembly, the antenna assembly includes: a millimeter wave module 110 and a dielectric layer 120.

The millimeter wave module 110 and the rear housing 130 are arranged in a spaced manner. That is, the millimeter wave module 110 is spaced apart from the rear housing 130. The millimeter wave module 110 is configured to transceive millimeter wave signal, a beam of the millimeter wave signal points towards the outside of the rear housing.

The millimeter wave module 110 may include an antenna array, and the antenna array may be an antenna processing millimeter wave signal, and may be implemented as a phase-controlled antenna array. It may also be configured to be an antenna array supporting millimeter wave communication, the antenna array may be a patch antenna, a dipole antenna, a yagi antenna, and a beam antenna or antenna arrays formed by other suitable antenna assembly. The specific type of the antenna array will not be further limited herein by the present disclosure, as long as the antenna array may transceive the millimeter wave signal.

The antenna array may be formed by multiple periodically arranged patch antenna units. The number of the antenna arrays depends on the specific scanning angle and gain. The present embodiment takes two-dimensional scanning as an example, the antenna array is in 1×4 rectangular arrangement. 1×4 antenna array has higher spatial coverage, and could be placed on the left and right sides of the phone, if performing the full space of three-dimensional scanning, the antenna array may be in rotationally symmetrical arrangement, the shape and the position may be changed accordingly.

The working frequency band of the millimeter wave module 110, which is also the working frequency band of the antenna array, is millimeter wave band. Millimeter wave is an electromagnetic wave with a wavelength in the magnitude of millimeters, and its frequency is approximately between 30 GHz and 300 GHz. The millimeter wave band includes at least the millimeter wave band of the 5th generation mobile communication system with a frequency of 24250 MHz-52600 MHz.

3GPP has specified the list of frequency bands supported by 5G NR, and the 5G NR spectrum range is up to 100 GHz, with two major frequency ranges specified: Frequency range 1 (FR1), which is below 6 GHz, and Frequency range 2 (FR2), which is the millimeter wave band. Frequency range of the Frequency range 1 is 450 MHz-6.0 GHz, where the maximum channel bandwidth is 100 MHz. Frequency range of the Frequency range 2 is 24.25 GHz-52.6 GHz, where the maximum channel bandwidth is 400 MHz. Nearly 11 GHz of spectrum for 5G mobile broadband includes: 3.85 GHz of licensed spectrum, e.g., 28 GHz (24.25-29.5 GHz), 37 GHz (37.0-38.6 GHz), 39 GHz (38.6-40 GHz) and 14 GHz of unlicensed spectrum (57-71 GHz). The working frequency bands of 5G communication system are 28 GHz, 39 GHz and 60 GHz.

The millimeter wave module 110 and the rear housing 130 are arranged in a spaced manner, and the beam of the millimeter wave signal transceived by the millimeter wave module 110 points towards the outside of the rear housing 130. For example, the millimeter wave module 110 may be arranged on a motherboard, and the motherboard and the rear housing are arranged in a spaced manner; millimeter wave signal may send and receive millimeter wave signal through the rear housing 130. The rear housing 130 may be a non-metal rear housing 130, or may also be a metal rear housing 130, which will be not be limited by the present disclosure.

The dielectric layer 120 is arranged on the rear housing 130 and in a target area 140 of the rear housing 130. The target area 140 at least includes an area where the millimeter wave module 110 is projected onto the rear housing 130. The dielectric layer 120 and the rear housing in the target area 140 together form a radiation layer 150 with gradient distribution of dielectric constant, the radiation layer 150 is used for changing a beam radiation direction of the millimeter wave signal.

As shown in FIG. 2, the dielectric layer 120 is arranged in the target area 140 of the rear housing 130. The area of the target area 140 is greater than the area projected onto the rear housing 130 by the millimeter wave module 110, and including the area projected onto the rear housing 130 by the millimeter wave module 110. That is, the projection of the millimeter wave module 110 is completely within the target area 140. Arranging the dielectric layer 120 in the target area 140 may change the distribution of the dielectric constant on the target area 140, such that a radiation layer 150 with gradient distribution of dielectric constant of dielectric constant may be formed on the target area 140. The millimeter wave module 110 sends and receives the millimeter wave signal through the radiation layer 150. Due to the gradient distribution of the dielectric constant of the radiation layer 150, the beam direction of the millimeter wave signals may be changed, for example, the beam of the millimeter wave signal may be tilted, aggregated, or diverged etc.

It should be noted that, when the rear housing 130 is made of non-metal material, the target area 140 may be any area corresponding to the millimeter wave module 110, "corresponding" means within the radiation range of the millimeter wave module 110; when the rear housing 130 is made of metal material or other conductive materials, for it is required to define a gap on the rear housing 130 to radiate millimeter wave signal, the target area 140 may be a part of the rear housing corresponding to the millimeter wave module adjacent to the gap, so that the radiation performance of the millimeter wave module 110 is not affected.

In the present embodiment, millimeter wave antenna module includes at least one antenna assembly, the antenna assembly includes a millimeter wave module 110 and a dielectric layer 120. The millimeter wave module 110 is spaced apart from the rear housing 130, and configured to transceive millimeter wave signal. A beam of the millimeter wave signal points towards the outside of the rear housing 130. The dielectric layer 120 is correspondingly arranged on the rear housing 130 and in a target area 140 of the rear housing 130. The target area 140 at least includes an area where the millimeter wave module 110 is projected onto the rear housing 130, the dielectric layer 120 and a part of the rear housing 130 in the target area 140 together form a radiation layer 150 with gradient distribution of dielectric constant. The radiation layer 150 is configured to change a beam radiation direction of the millimeter wave signal. By arranging the dielectric layer 120 on the rear housing 130 corresponding to the millimeter wave module 110, the radiation layer 150 with gradient distribution of dielectric constant of dielectric constant is formed on the rear housing 130, so that the beam direction of the millimeter wave signal could be changed, and the gain of the millimeter wave antenna apparatus 100 could be improved.

In one of the embodiments, the dielectric layer 120 may be material with high dielectric constant, such as a film with high dielectric constant. High dielectric material is material with dielectric constant greater than the dielectric constant of SiO2, the dielectric constant of SiO2 is 3.7, i.e., the dielectric constant of the dielectric layer 120 is greater than 3.7. For example, the dielectric layer 120 may be barium titanate-based materials and lead titanate-based materials having a structure of titanite phase, or may also be materials with high dielectric constants such as ceramics, quartz, and polyethylene.

In one of the embodiments, the dielectric constant of the dielectric layer 120 is greater than the dielectric constant of the rear housing 130. The thickness of the dielectric layer 120 may be reduced by using a dielectric layer 120 with high dielectric constant, so that the user experience is not affected.

In one of the embodiments, the cross-sectional shape of the dielectric layer 120 perpendicular to the rear housing 130 may be a rectangle, an ellipse, or a semi-circle. The shape of the dielectric layer 120 is also not limited by the present embodiment.

In one of the embodiments, the rear housing 130 includes a first face and a second face arranged opposite to each other, the dielectric layer 120 is arranged on the first face and/or the second face. The specific arrangement may be determined by the thickness and the dielectric constant of the dielectric layer 120, and will not be limited by the present embodiment.

In one of the embodiments, the dielectric layer 120 may include a first dielectric portion 121 and a second dielectric portion 122, the first dielectric portion 121 and the second dielectric portion 122 are planar type film or gradient type film. Planar type film may be interpreted as the thickness of the dielectric layer 120 stays the same, and the gradient type film may be interpreted as the thickness of the dielectric layer 120 changes. Different types of films may form different convex lens and concave lens, as long as the radiation direction of the millimeter wave signal could be changed. The thickness distribution of the first dielectric portion 121 and the second dielectric portion 122 is not limited by the present embodiment.

Figure 3A:
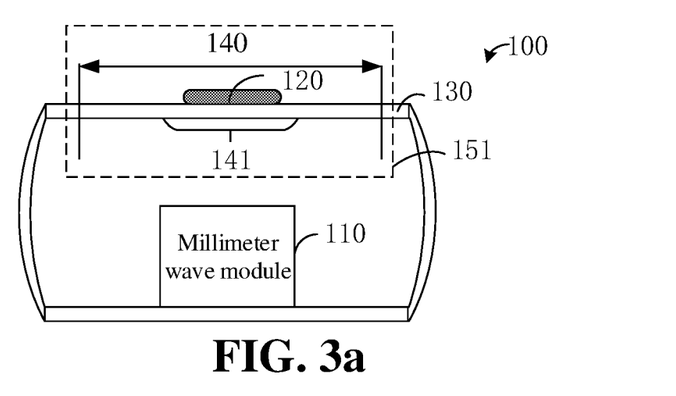
FIG. 3a is a schematic view of a radiation layer having a phase distribution of convex lens at the rear housing according to an embodiment of the present disclosure.
Figure 3B:
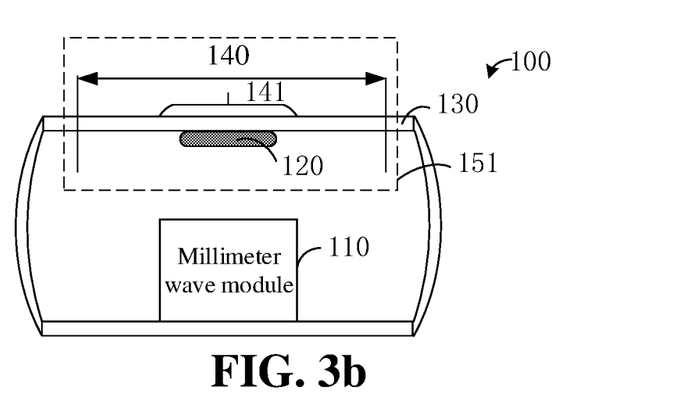
FIG. 3b is a schematic view of a radiation layer having a phase distribution of convex lens at the rear housing according to another embodiment of the present disclosure.

In one of the embodiments, as shown in FIG. 3a and FIG. 3b, the target area 140 includes a first area 141 where an orthographic projection of the millimeter wave module 110 on the rear housing 130 is located in. The dielectric layer 120 is arranged in the first area 141, the dielectric layer 120 and a part of the rear housing 130 in the target area 140 together form a first radiation layer 151 with phase distribution of convex lens of convex lens. The first radiation layer 151 is configured to focus the beam of the millimeter wave signal.

The dielectric layer 120 is arranged on an area projected onto the rear housing 130 by the millimeter wave module 110, i.e., the first area 141, in other words, the dielectric layer 120 is arranged on the rear housing 130 corresponding to the area right above the millimeter wave module 110. The first area 141 is at the center of the target area 140, so that a radiation layer 150 with phase distribution of convex lens may be formed at the target area 140. When the millimeter wave module 100 sends millimeter wave signal through the radiation layer 150, the millimeter wave signals may be focused at the focal point, and the millimeter wave signals may be radiated along the focal point, such that the orientation of the millimeter wave beam is improved.

A convex lens is a lens that is thin on both sides and thick in the middle. It should be noted that the thinness and the thickness in the present embodiment correspond to the phase difference in the principle of electromagnetic waves, where thinness corresponds to less phase accumulation of electromagnetic waves after passing through the convex lens, and thickness corresponds to more phase accumulation of electromagnetic waves after passing through the convex lens. As shown in the following equation.

$$\phi_{film+cover} = \frac{2\pi\sqrt{\varepsilon_{film}}}{\lambda} \times d_{film} + \frac{2\pi\sqrt{\varepsilon_{cover}}}{\lambda} \times d_{cover}$$

where $\phi_{film+cover}$ is the phase value of the millimeter wave signal beam, $\varepsilon_{film}$ is the dielectric constant of the dielectric layer 120, $d_{film}$ is the thickness of the dielectric layer 120, $\varepsilon_{cover}$ is the dielectric constant of the rear housing 130, $d_{cover}$ is the thickness of the rear housing 130, and $\lambda$ is the working wavelength of the millimeter wave module. When the millimeter wave signal beam passes through the rear housing 130, the phase accumulated in the rear housing 130 is $$\phi_{cover} = \frac{2\pi\sqrt{\varepsilon_{cover}}}{\lambda} \times d_{cover}$$

and, the remaining phase is:

$$\Delta\phi = \frac{2\pi\sqrt{\varepsilon_{film}}}{\lambda} \times d_{film}$$

As may be seen from the above formula, the amount of phase accumulation is proportional to the thickness of the dielectric layer 120 and the dielectric constant of the dielectric layer 120. Under the condition that the thickness of the dielectric layer 120 is certain, the greater the dielectric constant of the dielectric layer 120, the more phase accumulation, so that it may be easier to form a radiation layer 150 with phase distribution of convex lens, and may reduce the thickness of the dielectric layer 120, does not affect the user body feeling.

The phase distribution of convex lens may be interpreted as forming a radiation layer 150 with different phase differences in the target area 140 of the rear housing 130. The phase difference of the area where the dielectric layer 120 is arranged in is large, which means that the millimeter wave signal accumulates more phase after passing through the area; the phase difference of the area where the dielectric layer 120 is not arranged in is small, which means that the millimeter wave signal accumulates less phase after passing through the area. Arranging the dielectric layer 120 in the first area 141 corresponding to the orthographic projection of the millimeter wave module 110 could increase the phase difference in the first area 141, and not arranging the dielectric layer 120 on both sides of the first area 141, so that the phase difference on both sides of the first area 141 is smaller relative to the first area 141, and thus it is possible to form the first area 141 corresponding to the orthographic projection of the millimeter wave module 110 with a convex lens phase. When the millimeter-wave module 110 transceives millimeter wave signals, the beams of the millimeter wave signals in different directions may be gathered at the focal point by the dielectric layer 120 and radiated along the focal point extension direction, so that the orientation of the millimeter wave signal beams may be improved, thereby improving the gain of the millimeter wave antenna apparatus 100.

Figure 4:
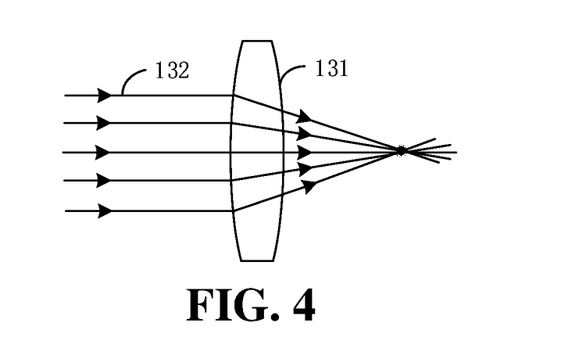
FIG. 4 is a schematic view of convex lens radiation according to an embodiment of the present disclosure.

As shown in FIG. 4, since millimeter wave has a high frequency, which is usually called quasi-optical, by providing the first radiation layer 151 with phase distribution of convex lens on the corresponding rear housing 130 and directly above the millimeter wave module 110, using the focusing principle of the convex lens 131 in optics, the convex lens 131 also has the property of gathering electromagnetic waves; on one hand, the orientation of the antenna may be improved and the orientational change of the signal bean 132 radiated by the millimeter wave module 110 may be reduced, so as to increase the gain of the millimeter wave module 110; on the other hand, since the resonant frequency of the millimeter wave module 110 is inversely related to the dielectric constant, the radiation layer 150 made of high dielectric constant material may reduce the size of the antenna array unit in the millimeter wave module 110, thus reducing the size of the millimeter wave module 110, and thus reducing the size of the millimeter wave module 110. Then, the area of the motherboard occupied by the millimeter wave module 110 may be reduced.

Figure 5A:
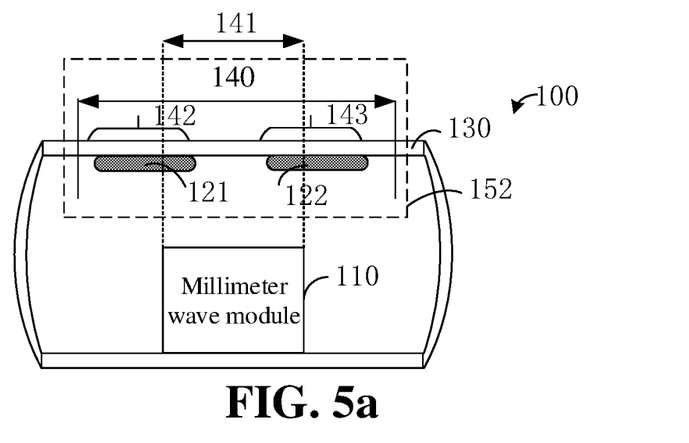
FIG. 5a is a schematic view of a second radiation layer having a phase distribution of concave lens according to an embodiment of the present disclosure.
Figure 5B:
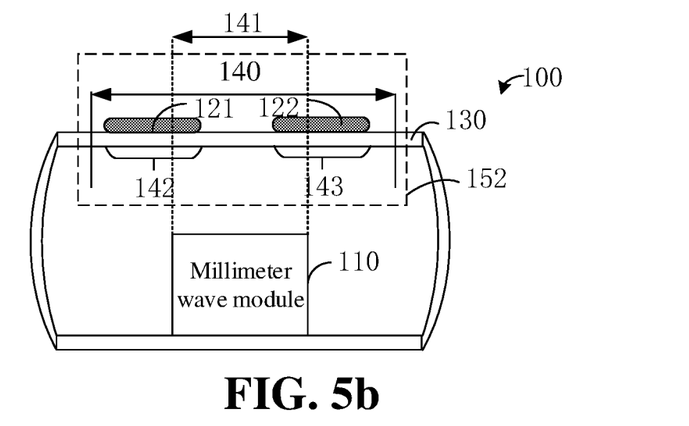
FIG. 5b is a schematic view of a second radiation layer having a phase distribution of concave lens according to another embodiment of the present disclosure.

In one embodiment, as shown in FIG. 5a and FIG. 5b, the target area 140 includes a first area 141 where an orthographic projection of the millimeter wave module on the rear housing is located in, a second area 142 distributed at one side of the first area 141, and a third area 143 distributed at another side of the first area 141. The second area 142 is spaced apart from the first area 141, or partly overlapped with the first area 141. The third area 143 is spaced apart from the first area 141 or partly overlapped with the first area 141.

The dielectric layer 120 includes a first dielectric portion 121 and a second dielectric portion 122. The first dielectric portion 121 is arranged in the second area 142, and the second dielectric portion 122 is arranged in the third area 143, so as to make the first dielectric portion 121, the second dielectric portion 122 and a part of the rear housing 130 in the target area 140 together form a second radiation layer 152 with phase distribution of concave lens, the second radiation layer 152 is configured to change the beam direction of the millimeter wave signal.

The target area 140 includes the second area 142 and the third area 143 arranged in a spaced manner. The second area 142 may be in the upper left area of the millimeter wave module 110 and the third area 143 may be in the upper right area of the millimeter wave module 110. Understandably, the right side of the second area 142 may overlap with the left side of the first area 141 or may be spaced apart from the first area 141, and the left side of the third area 143 may overlap with the right side of the first area 141 or may be spaced apart from the first area 141. The dielectric layer 120 includes the first dielectric portion 121 and the second dielectric portion 122 distributed arranged in a spaced manner. The first dielectric portion 121 may be in the second area 142 and the second dielectric portion 122 may be in the third area 143 to form a second radiation layer 152 with a phase distribution of concave lens in the target area 140 above the millimeter wave module 110. Using the divergence principle of concave lens in optics, on one hand, the beam scanning width of the millimeter wave module 110 may be extended, thereby improving the spatial coverage of the millimeter wave module 110; on the other hand, by introducing a dielectric layer 120 having a high dielectric constant, the stimulus of the surface wave mode may be suppressed to a certain extent, and the gain of the millimeter wave antenna apparatus 100 is improved.

Figure 6:
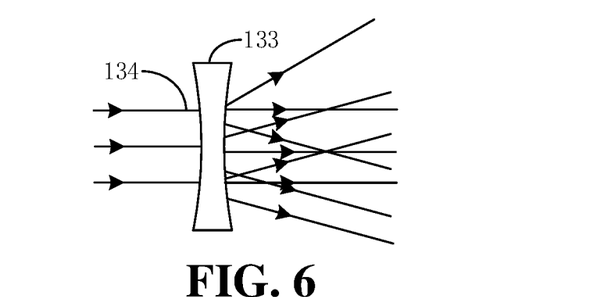
FIG. 6 is a schematic view of concave lens radiation according to an embodiment of the present disclosure.

The concave lens 133 is a lens that is thick on both sides and thin in the middle. It should be noted that the thin and thick in this embodiment corresponds to the phase difference in the principle of electromagnetic waves, where thin corresponds to less phase accumulation of electromagnetic waves after passing through the concave lens 133, and thick corresponds to more phase accumulation of electromagnetic waves after passing through the concave lens 13. The concave lens 133 phase distribution may be understood as forming a radiation layer 150 with different phase differences in the target area 140 of the rear housing 130. The phase difference of the area where the dielectric layer 120 is arranged at is large, i.e., the millimeter wave signal accumulates more phase after passing through the area; the phase difference of the area where the dielectric layer 120 is not arranged at is small, i.e., the millimeter wave signal accumulates less phase after passing through the area. Arranging the dielectric layer 120 at the second area 142 corresponding to the upper left of the millimeter wave module 110 and the third area 143 corresponding to the upper right of the millimeter wave module 110 could increase the phase difference between the second area 142 and the third area 143, and the dielectric layer 120 is not arranged in the first area 141 between the second area 142 and the third area 143, so the phase difference in the first area 141 is relatively less than the phase difference in the second area 142 and the third area 143, so that a radiation layer 150 with a phase distribution of concave lens 133 may be formed in the target area 140. As shown in FIG. 6, when the millimeter wave module 110 sends and receives millimeter wave signals, the beam 134 of the millimeter wave signals may be diverged through the dielectric layer 120, so that the beam scanning width of the millimeter wave module 110 may be extended, thus improving the millimeter wave spatial coverage of the module 110.

In one embodiment, the first dielectric portion 121 arranged on one side of the first area and the second dielectric portion 122 arranged on the other side of the first area are symmetrically, so that the orthographic projection of the millimeter wave module 110 on the rear housing 130 is at the center of the target area 140, so that the second radiation layer 152 with phase distribution of concave lens is formed right above the millimeter wave module 110, to make the main beam of the millimeter wave radiation to coincide with the focal point of concave lens, thereby extending the coverage of the millimeter wave signal beam more effectively.

In one embodiment, a distance between the first dielectric portion 121 and the second dielectric portion 122 is 0.5 to 2 times a wavelength of the millimeter wave signal. The first area 141 where the orthographic projection of the millimeter wave module 110 on the rear housing 130 is located in is between the first dielectric portion 121 and the second dielectric portion 122; by arranging the first dielectric portion 121 on one side of the first area 141 and arranging the second dielectric portion 122 on the other side of the first area 141, a second radiation layer 152 could be formed with phase distribution of concave lens of concave lens at the target area 140, thus extending the radiation range of the millimeter wave beam, and suppress the stimulus of the surface wave to some extent and improve the gain of the antenna.

The present disclosure embodiment improves the gain of the millimeter wave antenna apparatus 100 by spacing the first dielectric portion 121 and the second dielectric portion 122 by 0.5 times to 2 times the wavelength of the millimeter wave signal, which could also extend the beam scanning width of the millimeter wave module 110 to improve the spatial coverage of the millimeter wave module 110, and could suppress the stimulus of surface wave modes to a certain extent.

Figure 7A:
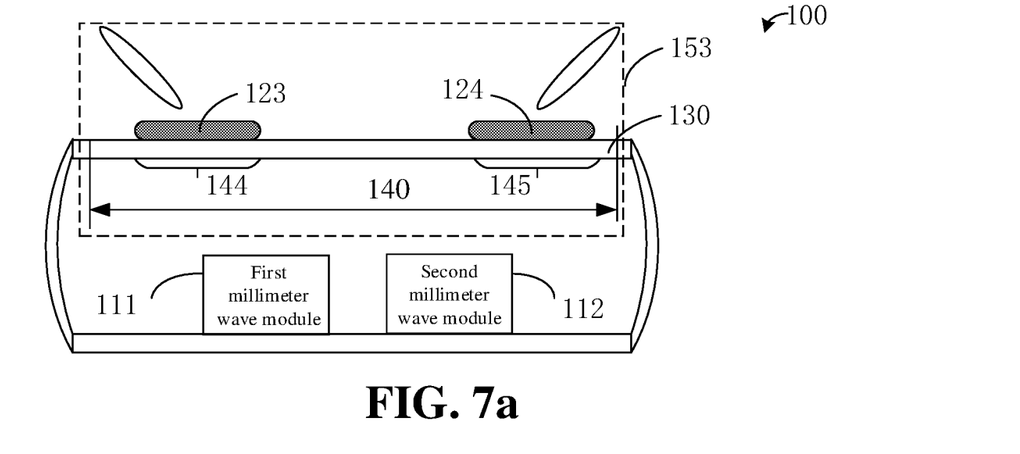
FIG. 7a is a first schematic view of a millimeter wave antenna apparatus according to another embodiment of the present disclosure.
Figure 7B:
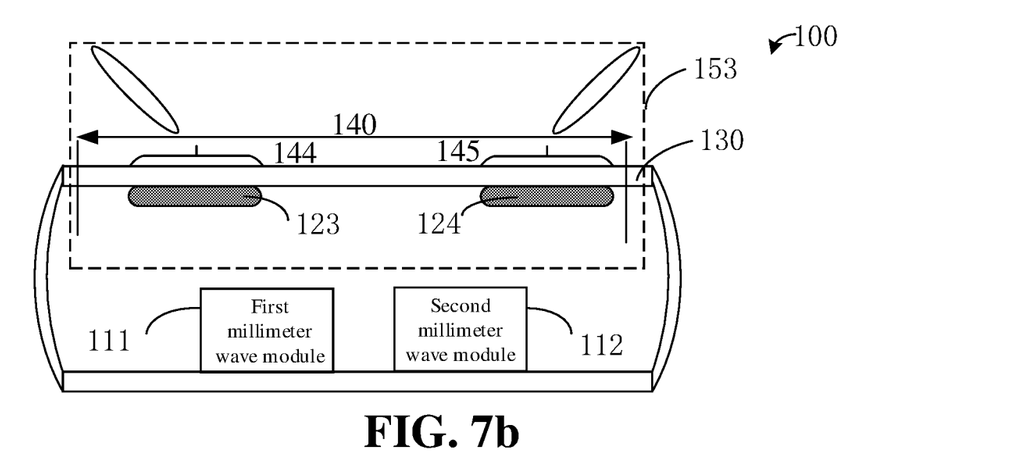
FIG. 7b is a second schematic view of a millimeter wave antenna apparatus according to another embodiment of the present disclosure.

In one embodiment, as shown in FIG. 7a and FIG. 7b, the antenna assembly further includes a first millimeter wave module 111 and a second millimeter wave module 112. The target area 140 includes a fourth area 144 and a fifth area 145 distributed spacing apart from each other. An orthographic projection of the first millimeter wave module 111 and an orthographic projection of the second millimeter wave module 112 are both partly within the range of between the fourth area 144 and the fifth area 145. The dielectric layer 120 includes a third dielectric portion 123 and a fourth dielectric portion 124 spaced apart from each other. The third dielectric portion 123 is arranged in the fourth area 144, the fourth dielectric portion 124 is arranged in the fifth area 145. The third dielectric portion 123, the fourth dielectric portion 124 and a part of the rear housing 130 in the target area 140 together form a third radiation layer 153. The third radiation layer 153 is configured to change a beam direction of the millimeter wave signal.

By arranging the third dielectric portion 123 at the rear housing 130 corresponding to the upper left of the first millimeter wave module 111, i.e. the fourth area 144, and arranging the fourth dielectric portion 124 at the rear housing 130 corresponding to the upper right of the second millimeter wave module 112, i.e. the fifth area 145, the dielectric constant of the fourth area 144 and the fifth area 145 may be improved, so that making the beam of the first millimeter wave module 111 at 0° direction tilt to the left side, and the beam of the second millimeter wave module 112 at 0° direction tilt to the right side. Under the control of the phase shifter, the first millimeter wave module 111 may cover range from −90° to 0°, the second millimeter wave module 112 may cover range from 0° to 90°. Therefore, the complementary coverage may be performed by the cooperative use of the first millimeter wave module 111 and the second millimeter wave module 112, thus greatly improving the spatial coverage efficiency of the millimeter wave antenna apparatus 100.

The present disclosure also provides an electronic device, which includes the millimeter wave antenna apparatus 110 from any above-mentioned embodiment.

In one embodiment, the above-mentioned millimeter wave antenna apparatus 100 may be arranged in a frame of the electronic device, and the frame may be on the periphery of the electronic device. The transmission and reception of millimeter wave may be accomplished by opening an antenna window in the bezel or using a non-metallic battery cover.

The electronic device has a top and a bottom, the top and the bottom are arranged along the length direction of the electronic device relative to each other. It should be noted that the bottom of the electronic device is usually closer to the part held by the user. In order to reduce the impact on the antenna when holding the electronic device, in the design of the millimeter wave antenna apparatus 100, the millimeter wave antenna apparatus 100 may be arranged closer to the top compared to the bottom. Also, the millimeter wave antenna apparatus 100 may also be on opposite sides of the width direction of the electronic device, and each millimeter wave antenna apparatus 100 is arranged in the direction of the length of the mobile electronic device. That is, the millimeter wave antenna apparatus 100 may be provided at the long side of the electronic device.

The electronic device having the millimeter wave antenna apparatus 100 of any of the above embodiments enables beam scanning of the antenna array, which in turn enables the antenna switching and beam scanning functions required for millimeter wave 5G communications to improve communication quality.

The electronic device may be a communication module including a mobile phone, tablet, laptop, PDA, Mobile Internet Device (MID), wearable device (e.g., smart watch, smart bracelet, pedometer, etc.) or other antennae that may be set up.

Figure 8:
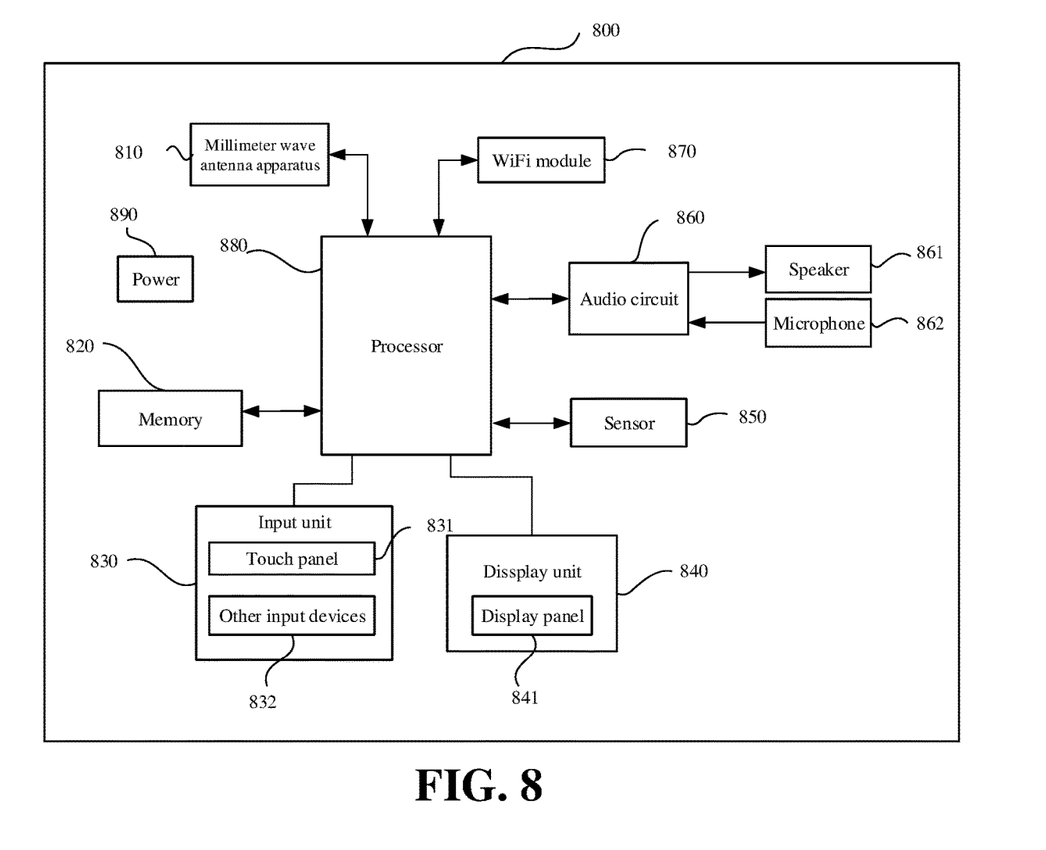
FIG. 8 is a partial schematic view of a mobile terminal related to an electronic device according to an embodiment of the present disclosure.

The embodiment of the present disclosure also provides an electronic device. As shown in FIG. 8, for the purpose of illustration, only those parts related to the present disclosure embodiment are shown, and where specific technical details are not disclosed, please refer to the method section of the present disclosure embodiment. The electronic device may be any terminal device including a mobile phone, a tablet computer, a PDA (Personal Digital Assistant), a POS (Point of Sales), a car computer, a wearable device, etc. Taking the electronic device being a cell phone as an example.

FIG. 8 shows a block diagram of a portion of the structure of a mobile phone associated with the electronic device provided in an embodiment of the present disclosure. Referring to FIG. 8, the mobile phone includes components such as: a millimeter wave antenna apparatus 810, a memory 820, an input unit 830, a display unit 840, a sensor 850, an audio circuit 860, a wireless fidelity (WiFi) module 870, a processor 880, and a power supply 890. It will be understood by those skilled in the art that the structure of the mobile phone shown in FIG. 8 does not constitute a limitation of the phone, and may include more or fewer components than shown, or a combination of certain components, or a different arrangement of components.

The millimeter wave apparatus apparatus 810 may be used for receiving and transmitting signals during sending and receiving information or calls, and may receive downlink information from the base station and give it to the processor 880 for processing; it may also send the uplink data to the base station. Typically, the millimeter wave antenna apparatus includes, but not limited to, an antenna, at least one amplifier, a transceiver, a coupler, a low noise amplifier (LNA), a duplexer, and the like. In addition, the millimeter wave antenna apparatus 810 may also communicate with networks and other devices via wireless communications. The above wireless communication may use any communication standard or protocol, including but not limited to Global System of Mobile communication (GSM), General Packet Radio Service (GPRS), Code Division Multiple Access (CDMA), Wideband Code Division Multiple Access (WCDMA), Long Term Evolution (LTE), e-mail, Short Messaging Service (SMS), and other services, etc.

The memory 820 may be used to store software programs as well as modules, and the processor 880 performs various functional applications of the mobile phone as well as data processing by running the software programs as well as modules stored in the memory 820. Memory 820 may primarily include a program storage area and a data storage area, wherein the program storage area may store an operating system, applications required for at least one function (e.g., applications for sound playback functions, applications for image playback functions, etc.), etc.; and the data storage area may store data created based on the use of the mobile phone (e.g., audio data, address book, etc.), etc. In addition, the memory 820 may include high-speed random access memory, and may also include non-volatile memory, such as at least one disk memory device, flash memory device, or other volatile solid state memory device.

Input unit 830 may be used to receive incoming numeric or character information and to generate key signal input related to user settings of the mobile phone 800 as well as functional controls. Specifically, input unit 830 may include touch panel 831 as well as other input devices 832. The touch panel 831, which may also be referred to as a touch screen, may collect user touch operations on or near it (e.g., user operations on or near touch panel 831 using any suitable object or attachment such as a finger, stylus, etc.) and drive the corresponding connection according to a predetermined program of the device. In one embodiment, the touch panel 831 may include two parts: a touch detection device and a touch controller. The touch detection device detects the user's touch orientation and detects the signal brought by the touch operation and sends the signal to the touch controller; the touch controller receives the touch information from the touch detection device and converts it into contact coordinates and sends it to the processor 880, and may receive commands from the processor 880 and execute them. In addition, use resistive, capacitive, infrared and surface acoustic wave and other types of implementation of the touch panel 831. in addition to the touch panel 831, the input unit 830 may also include other input devices 832. Specifically, other input devices 832 may include, but not limited to, one or more of the physical keyboard, function keys (such as volume control buttons, switch buttons, etc.), etc.

The display unit 840 may be used to display information entered by or provided to the user and various menus of the mobile phone. The display unit 840 may include a display panel 841. In one embodiment, the display panel 841 may be configured in the form of a liquid crystal display (LCD), an organic light-emitting diode (OLED), etc. In one embodiment, the touch panel 831 may overlay display panel 841, and when touch operation is detected by touch panel 831 on or near it, it is transmitted to processor 880 to determine the type of touch event, and subsequently processor 880 provides a corresponding visual output on display panel 841 based on the type of touch event. Although in FIG. 8, touch panel 831 and display panel 841 are used as two separate components to implement the input and input functions of the mobile phone. In some embodiments, touch panel 831 may be integrated with display panel 841 to implement the input and output functions of the phone.

The mobile phone 800 may also include at least one sensor 850, such as a light sensor, a motion sensor, and other sensors. Specifically, the light sensor may include an ambient light sensor and a proximity sensor, wherein the ambient light sensor may adjust the brightness of the display panel 841 based on the brightness of the ambient light, and the proximity sensor may turn off the display panel 841 and/or the backlight when the mobile phone is moved to the ear. The motion sensor may include an acceleration sensor, through which the size of acceleration in each direction may be detected, and the size and direction of gravity may be detected when stationary, which may be used for applications that identify the posture of the phone (such as horizontal and vertical screen switching), vibration recognition-related functions (such as pedometer, tapping), etc.; in addition, the phone may be configured with a gyroscope, barometer, hygrometer, thermometer, infrared sensor and other sensors.

An audio circuit 860, a speaker 861, and a microphone 862 may provide an audio interface between the user and the mobile phone. The audio circuit 860 may transmit the received audio data and the audio data is converted into electrical signals to the speaker 861, which is converted into sound signals for output; on the other hand, the microphone 862 converts the collected sound signals into electrical signals, which are received by the audio circuit 860 and converted into audio data, which is then processed by the audio data output processor 880 and, after being processed by the millimeter wave antenna apparatus 810, may be send to another mobile phone, or output audio data to memory 820 for subsequent processing.

WiFi is a short-range wireless transmission technology, and the mobile phone may help the user send and receive emails, browse the web, and access streaming media, etc. through WiFi module 870. The WiFi module 870 provides wireless broadband internet access to the user. Although FIG. 8 illustrates WiFi module 870, it is understood that it is not a required component of mobile phone 800 and may be omitted as needed.

The processor 880 is the control center of the phone and connects various parts of the entire mobile phone using various interfaces and lines to perform various functions and process data of the mobile phone by running or executing software programs and/or modules stored in the memory 820 and calling data stored in the memory 820, thereby providing overall monitoring of the phone. In one embodiment, the processor 880 may include one or more processing units. In one embodiment, the processor 880 may integrate an application processor and a modem processor, wherein the application processor primarily handles the operating system, user interface, applications, etc.; and the modem processor primarily handles wireless communications. Understandably, the above modem processor may not be integrated into processor 880.

The mobile phone 800 also includes a power supply 890 (e.g., a battery) to power the various components, and the power supply may be logically connected to the processor 880 through a power management system, thereby enabling functions such as managing charging, discharging, and power consumption management through the power management system.

In one embodiment, the mobile phone 800 may also include a camera, Bluetooth module, etc.

Any reference to a memory, storage, database, or other medium as used in the present disclosure may include non-volatile and/or volatile memory. Non-volatile memory may include read-only memory (ROM), programmable ROM (PROM), electrically programmable ROM (EPROM), electrically erasable programmable ROM (EEPROM), or flash memory. Volatile memory may include random access memory (RAM), which is used as external cache memory. By way of illustration and not limitation, RAM is available in a variety of forms, such as static RAM (SRAM), dynamic RAM (DRAM), synchronous DRAM (SDRAM), double data rate SDRAM (DDR SDRAM), enhanced SDRAM (ESDRAM), synchronous link (Synchlink) DRAM (SLDRAM), memory bus (Rambus) direct RAM (RDRAM), direct memory bus dynamic RAM (DRDRAM), and memory bus dynamic RAM (RDRAM).

The above described embodiments express only several embodiments of the present disclosure, and the descriptions of the embodiments are more specific and detailed, but they should not be considered as a limitation of the scope of the patent of the present disclosure. It should be noted that for a person of ordinary skill in the art, a number of variations and improvements may be made without departing from the conception of the present disclosure, and these belong to the scope of protection of the present disclosure. Therefore, the scope of protection of the patent of this application shall be subject to the attached claims.

What is claimed is:

1. A millimeter wave antenna apparatus for an electronic device, comprising:
    a rear housing, and
    at least one antenna assembly, the at least one antenna assembly comprising:
        a millimeter wave module, spaced apart from the rear housing, and being configured to transceive millimeter wave signal; a beam of the millimeter wave signal pointing towards the outside of the rear housing; and
        a dielectric layer, arranged in a target area of the rear housing, the target area at least comprising an area where the millimeter wave module is projected onto the rear housing, the dielectric layer and a part of the rear housing in the target area together forming a radiation layer with gradient distribution of dielectric constant, and the radiation layer being configured to change a beam radiation direction of the millimeter wave signal.

2. The millimeter wave antenna apparatus according to claim 1, wherein a dielectric constant of the dielectric layer is greater than a dielectric constant of the rear housing.

3. The millimeter wave antenna apparatus according to claim 2, wherein the target area comprises a first area where an orthographic projection of the millimeter wave module on the rear housing is located in, a second area at one side of the first area and a third area at the other side of the first area; the second area is spaced apart from the first area, or partly overlapped with the first area; the third area is spaced apart from the first area, or partly overlapped with the first area; and
    the dielectric layer comprises a first dielectric portion and a second dielectric portion, wherein the first dielectric portion is arranged in the second area, the second dielectric portion is arranged in the third area; the first dielectric portion, the second dielectric portion and the part of the rear housing in the target area together form a second radiation layer having a phase distribution of concave lens, the second radiation layer is configured to change a beam direction of the millimeter wave signal.

4. The millimeter wave antenna apparatus according to claim 3, wherein the first dielectric portion and the second dielectric portion are arranged symmetrically at both sides of the first area.

5. The millimeter wave antenna apparatus according to claim 3, wherein a distance between the first dielectric portion and the second dielectric portion is 0.5 to 2 times a wavelength of the millimeter wave signal.

6. The millimeter wave antenna apparatus according to claim 1, wherein in response to the rear housing being made of non-metal materials, the target area comprises any area corresponding to the millimeter wave module, wherein the corresponding area is within a radiation range of the millimeter wave module.

7. The millimeter wave antenna apparatus according to claim 1, wherein in response to the rear housing being made of metal or other conductive materials, a gap is arranged at the rear housing to radiated millimeter wave signal, the target area comprises the rear housing corresponding to the millimeter wave module and adjacent to the gaps.

8. The millimeter wave antenna apparatus according to claim 1, wherein the cross-sectional shape of dielectric layer perpendicular to the rear housing is a rectangle, an ellipse, or a semi-circle.

9. The millimeter wave antenna apparatus according to claim 1, wherein the target area comprises a first area where an orthographic projection of the millimeter wave module on the rear housing is located in; the dielectric layer is arranged in the first area, the dielectric layer and the part of the rear housing in the target area together form a first radiation layer having a phase distribution of convex lens, the first radiation layer is configured to focus a beam of the millimeter wave signal.

10. The millimeter wave antenna apparatus according to claim 1, wherein the antenna assembly further comprises a first millimeter wave module and a second millimeter wave module;
the target area comprises a fourth area and a fifth area distributed spacing apart from each other; an orthographic projection of the first millimeter wave module and an orthographic projection of the second millimeter wave module are both partly within the range of between the fourth area and the fifth area; and
the dielectric layer comprises a third dielectric portion and a fourth dielectric portion arranged in a spaced manner, the third dielectric portion is arranged in the fourth area, the fourth dielectric portion is arranged in the fifth area; the third dielectric portion, the fourth dielectric portion and the part of the rear housing in the target area together form a third radiation layer, the third radiation layer is configured to change a beam direction of the millimeter wave signal.

11. The millimeter wave antenna apparatus according to claim 1, wherein the dielectric layer comprises a planar type film or a gradient type film.

12. The millimeter wave antenna apparatus according to claim 1, wherein the millimeter wave module comprises an antenna array, and the antenna array comprises a plurality of periodically arranged patch antenna units.

13. An electronic device comprising a rear housing and a millimeter wave antenna apparatus; the millimeter wave antenna apparatus comprising at least one antenna assembly, the at least one antenna assembly comprising:
a millimeter wave module, spaced apart from the rear housing, and being configured to transceive millimeter wave signal; a beam of the millimeter wave signal pointing towards the outside of the rear housing; and
a dielectric layer, arranged on the rear housing and in a target area of the rear housing, the target area at least comprising an area where the millimeter wave module is projected onto the rear housing, the dielectric layer and a part of the rear housing in the target area together forming a radiation layer with gradient distribution of dielectric constant, and the radiation layer being configured to change a beam radiation direction of the millimeter wave signal.

14. The electronic device according to claim 13, wherein a dielectric constant of the dielectric layer is greater than the dielectric constant of the rear housing.

15. The electronic device according to claim 13, wherein the target area comprises a first area where an orthographic projection of the millimeter wave module on the rear housing is located in; the dielectric layer is arranged in the first area, the dielectric layer and the part of the rear housing in the target area together form a first radiation layer having a phase distribution of convex lens, the first radiation layer is configured to focus a beam of the millimeter wave signal.

16. The electronic device according to claim 13, wherein the target area comprises a first area where an orthographic projection of the millimeter wave module on the rear housing is located in; a second area at one side of the target area and a third area at the other side of the target area; the second area is spaced apart from the first area, or partly overlapped with the first area; the third area is spaced apart from the first area or partly overlapped with the first area; and
the dielectric layer comprises a first dielectric portion and a second dielectric portion, wherein the first dielectric portion is arranged in the second area, the second dielectric portion is arranged in the third area; the first dielectric portion, the second dielectric portion and the part of the rear housing in the target area together form a second radiation layer having a phase distribution of concave lens, the second radiation layer is configured to change a beam direction of the millimeter wave signal.

17. The electronic device according to claim 13, wherein the antenna assembly further comprises a first millimeter wave module and a second millimeter wave module; the target area comprises a fourth area and a fifth area spacing apart from each other; an orthographic projection of the first millimeter wave module and an orthographic projection of the second millimeter wave module are both partly within the range of between the fourth area and the fifth area; the dielectric layer comprises a third dielectric portion and a fourth dielectric portion arranged in a spaced manner, the third dielectric portion is arranged in the fourth area, the fourth dielectric portion is arranged in the fifth area; the third dielectric portion, the fourth dielectric portion and the part of the rear housing in the target area together form a third radiation layer, the third radiation layer is configured to change a beam direction of the millimeter wave signal.

18. The electronic device according to claim 13, wherein the electronic device comprises a top and a bottom, the top and the bottom are opposite to each other along the length of the electronic device, and the millimeter wave antenna apparatus is arranged closer to the top than to the bottom.

19. A rear housing assembly for an electronic device, comprising:
a rear housing, and
a dielectric layer, arranged on an area of the rear housing, wherein the area of the rear housing is configured to be an area where an orthographic projection of a millimeter wave module of the electronic device on the rear housing is located in;
wherein the dielectric layer and a part of the rear housing in the area together form a radiation layer with gradient distribution of dielectric constant; a dielectric constant of the dielectric layer is different from that of the rear housing; the radiation layer is configured to change a beam radiation direction of millimeter wave signal transceived by the millimeter wave module.

20. The rear housing assembly for an electronic device according to claim 19, wherein the millimeter wave module further comprises a first millimeter wave module and a second millimeter wave module;
wherein the area of the rear housing comprises a fourth area and a fifth area distributed spacing apart from each other, and an orthographic projection of the first millimeter wave module and an orthographic projection of the second millimeter wave module are both partly within the range of between the fourth area and the fifth area; and
wherein the dielectric layer comprises a third dielectric portion and a fourth dielectric portion arranged in a spaced manner, the third dielectric portion is arranged in the fourth area, the fourth dielectric portion is arranged in the fifth area; and the third dielectric portion, the fourth dielectric portion, and the part of the rear housing in the area together form a third radiation layer, and the third radiation layer is configured to change a beam direction of the millimeter wave signal.

\* \* \* \* \*